H. L. BOYER.
APPARATUS FOR APPLYING RIBS TO STORAGE BATTERY SEPARATORS.
APPLICATION FILED JULY 6, 1915.

1,297,642.

Patented Mar. 18, 1919.
2 SHEETS—SHEET 1.

Inventor.
Harry L. Boyer
by Thurston & Kwis
Attys.

H. L. BOYER.
APPARATUS FOR APPLYING RIBS TO STORAGE BATTERY SEPARATORS.
APPLICATION FILED JULY 6, 1915.

1,297,642.

Patented Mar. 18, 1919.
2 SHEETS—SHEET 2.

Inventor.
Harry L. Boyer
by Thurston & Kwis
Attys.

UNITED STATES PATENT OFFICE.

HARRY L. BOYER, OF TRENTON, NEW JERSEY.

APPARATUS FOR APPLYING RIBS TO STORAGE-BATTERY SEPARATORS.

1,297,642.　　　　　Specification of Letters Patent.　　Patented Mar. 18, 1919.

Application filed July 6, 1915. Serial No. 38,064.

*To all whom it may concern:*

Be it known that I, HARRY L. BOYER, a citizen of the United States, residing at Trenton, in the county of Mercer and State of New Jersey, have invented a certain new and useful Improvement in Apparatus for Applying Ribs to Storage-Battery Separators, of which the following is a full, clear, and exact description.

This invention relates to a machine or apparatus for applying ribs to flat storage battery separators, particularly rubber separators, and has for its chief object to provide means by which ribs may be applied rapidly and efficiently.

At the present time ribs are applied to separators composed of certain material, such as rubber and celluloid, very largely by hand labor, which requires that the ribs be separately handled and either applied directly to the separators or placed in grooves of one part of a vulcanizing mold, so that they may be vulcanized to a separator placed in another part of the mold and in contact with the strips. The methods heretofore employed for this purpose, while producing satisfactory results as far as the completed separator is concerned, are unsatisfactory due to the time and labor required to apply the ribs to the separators and to cause them to adhere thereto.

The machine constructed in accordance with my invention applies the ribs rapidly and effectively, and by eliminating practically all the hand labor required heretofore it reduces very materially the cost of the finished separator. This is accomplished with the present machine by feeding separators between a pair of pressure devices preferably in the form of rolls, and simultaneously pressing rib-forming material in the form of strips onto the moving separators which can afterward be cut apart or separated by severing the strips between the separators, and in the event rubber separators are being ribbed can be placed in a vulcanizer to cure the ribs and cause them to be knitted firmly to the separators.

My invention may be further briefly summarized as consisting in certain novel details of construction and combinations and arrangements of parts which will be described in the specification and set forth in the appended claims.

Figure 1:
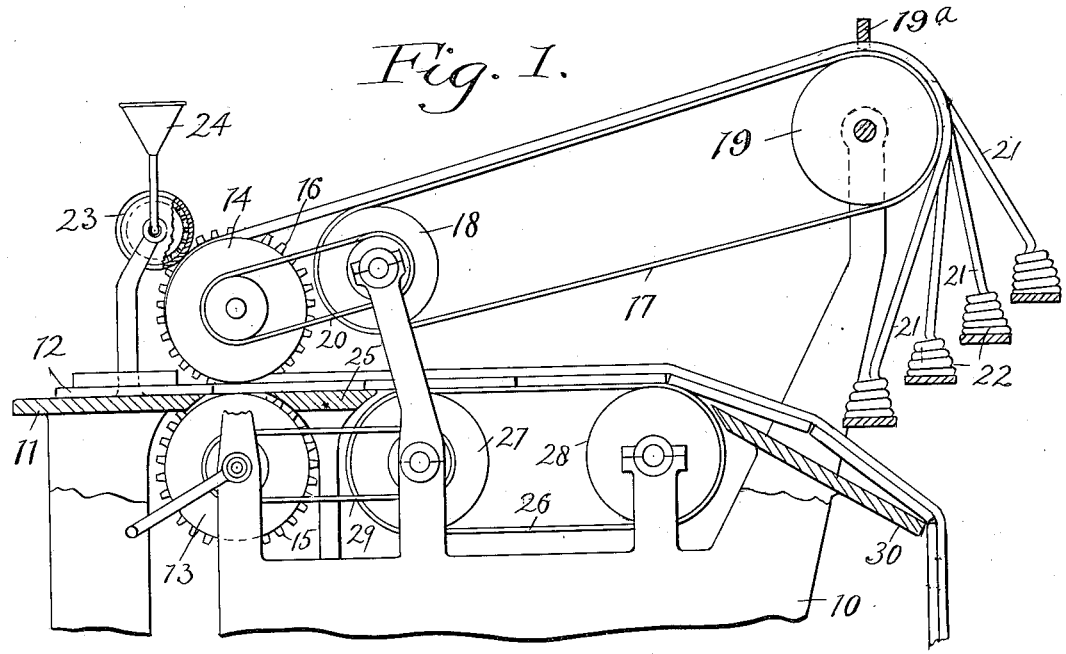
Figure 2:
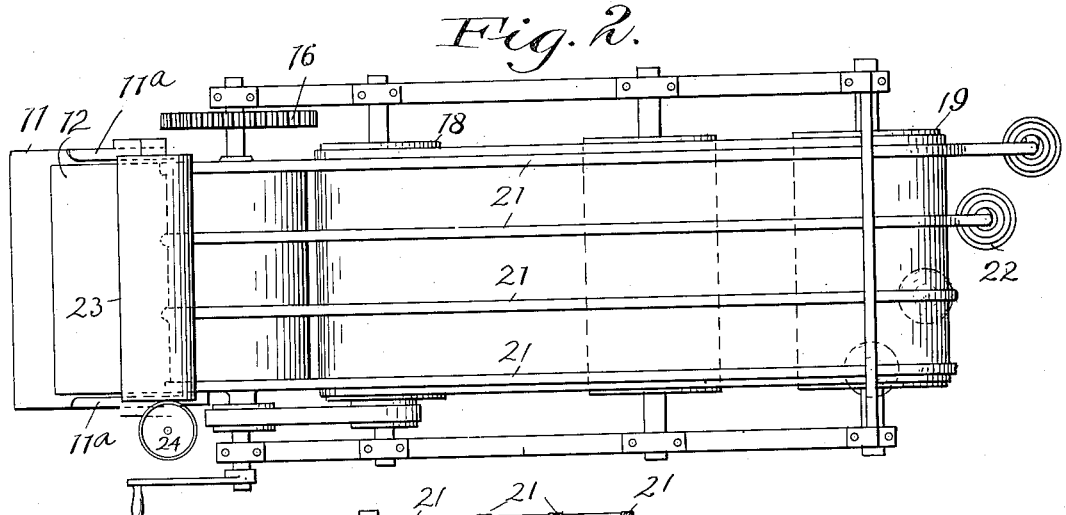
Figure 3:
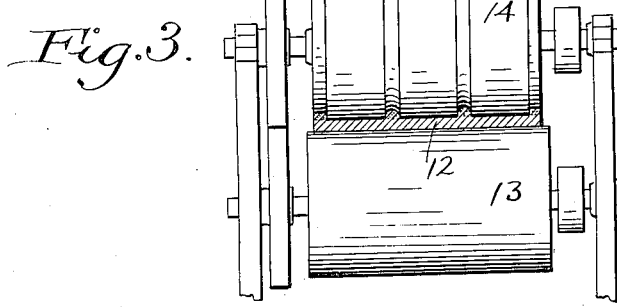
Figure 4:
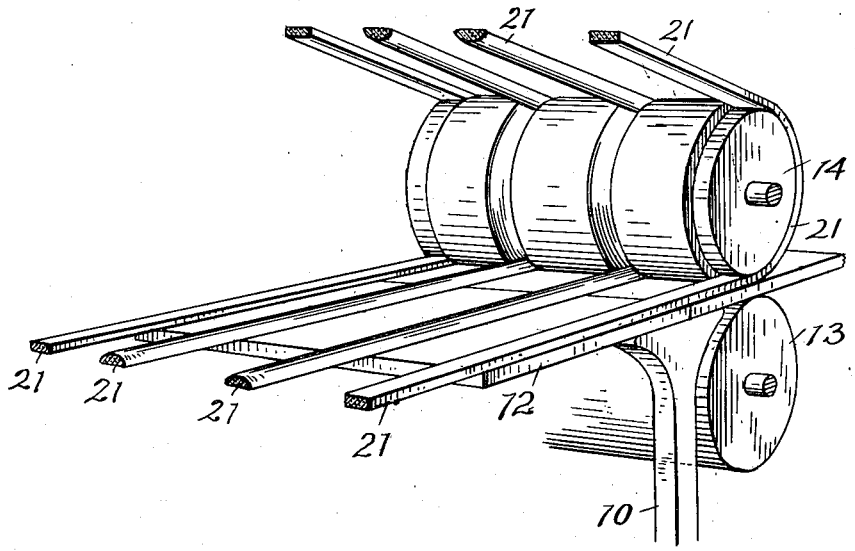
Figure 5:
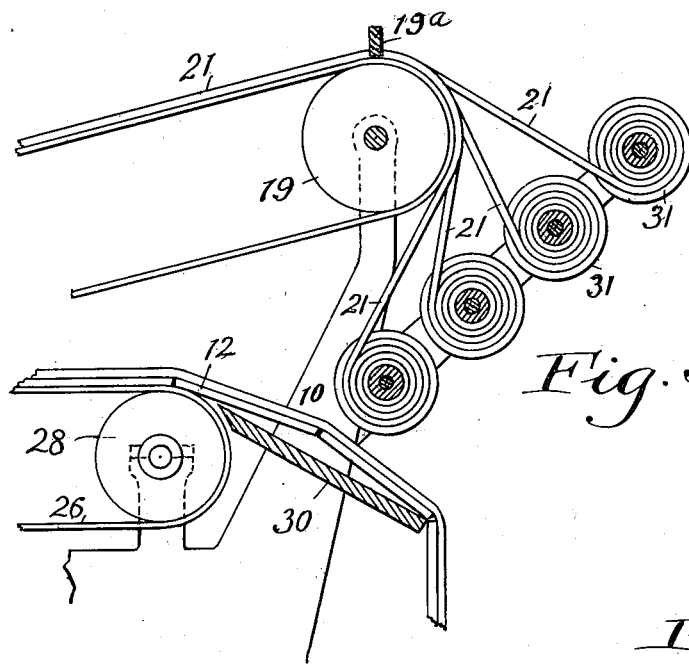

In the accompanying sheet of drawings wherein I have shown one embodiment of my invention, Figure 1 is a side view of the rib-applying apparatus with parts in section and parts broken away; Fig. 2 is a top plan view of the same; Fig. 3 is a vertical sectional view adjacent the pressure rolls, this view showing the rolls in elevation and illustrating the manner in which the rib forming strips are applied to the grooves of the upper roll and the manner in which these strips are pressed onto the separators when the separators and strips are passed between the rolls; Fig. 4 is a perspective view looking at the inside of the machine or toward the rear or discharge side of the rib-applying rolls and showing a ribbed separator emerging from between the rolls; and Fig. 5 is a view of the upper rear part of the machine showing a modification in the manner of supplying the strips to the conveyer leading to the rib-applying rolls, this modification being adapted for supplying strips such as celluloid having greater tensile strength than unvulcanized rubber.

This machine or apparatus, as here shown, includes a frame 10 on which are rotatably supported various rolls, drums and conveying belts hereinafter referred to. Near the front of the machine is a feeding table 11 for flat storage battery separators 12, this table having a pair of guides 11ᵃ between which the separators pass. It might be stated at this point that the separators may be fed or supplied to the rolls by hand or automatically, as will be obvious. Just beyond the feeding table are two rolls 13 and 14, one of which is above the other and which are spaced apart a distance equal substantially to the thickness of the separators. The upper roll 14 is provided with a series of peripheral grooves which are adapted to accommodate rib-forming material in the form of strips and are spaced apart a distance equal to the spacing of the ribs which are to be applied to the separators. These two rolls constitute feeding rolls and also pressure applying devices which squeeze the rib-forming material onto the separators which pass between the rolls.

In the present case the shaft of the drum 13 is provided with a hand crank by which the various moving parts of the machine are operated, but, as is obvious, the machine may be operated by power applied at any suitable point or points. The two rolls 13 and 14 are provided with engaging gears 15 and 16 through which the upper roll is driven by the lower at the same speed as the latter.

The strips which are applied to the separators are supplied to the grooves of the upper roll 14 and are conveyed thereto in this instance by a conveyer including an endless belt 17 which runs about a pair of drums 18 and 19 suitably supported on the frame, one of these drums 18 being adjacent the roll 14 and being driven by the latter through a belt 20. The strips which are shown at 21 may be supplied to this belt from any suitable source or sources of supply, but in case the machine is employed for applying unvulcanized rubber strips or strands to flat rubber separators, the strips are preferably drawn onto the conveyer belt 17 from coils or piles 22 supported on shelves which are placed beneath the drum. When rubber separators are being ribbed, I prefer to supply the strips to the belt conveyer in the manner shown and described, because unvulcanized rubber has practically no tensile strength, and if drawn from reels or supplied in any other manner which requires any stretching or pulling on the strips the latter might and probably would be broken.

Assuming again that rubber separators are being ribbed, rubber compound is made into strips or strands either by first being rolled into sheets and cut up into strips, or it is placed in a rubber squirting machine and squirted through dies, the latter method being preferable. While the strips are squirted they are allowed to accumulate in the piles 22 and are kept from sticking together by being dusted with a powder or a common flour. After a sufficient amount of each strip or strand has been squirted, the coils or piles are placed under the machine on the shelves, as shown in Fig. 1, each pile being in proper position so that when the strips are drawn up onto the belt conveyer they are a proper distance apart and will be in parallel rows. Just above the drum 19 is a spacer 19ª which has openings through which the strips pass and which insures their being spaced on the belt the proper distance apart. The strips, after being conveyed down the belt, pass onto and around the roll 14, each strip being in one of the grooves of the roll.

Just before strips are applied to the separators they are coated with a substance which renders them sticky or very adhesive. The nature of this substance will depend upon the kind of separators which are being ribbed. In the event unvulcanized rubber strips are applied to rubber separators, as in this instance, the strips will be coated with gasolene. In the event celluloid strips are applied to celluloid separators, the strips will be coated with some suitable cement such as celluloid dissolved in acetone.

The cement or other substance which makes the strips adhesive, is applied to the strips by means of a hollow drum 23 suitably supported in the frame of the machine adjacent the roll 14. This drum is provided on its periphery with a layer of felt which engages the periphery of the roll 14, or at least the surfaces of the strips in the grooves of this roll, and the drum is provided with suitable openings through which the gasolene or other substance will pass from the interior of the drum and saturate the felt. This substance may be applied to the drum from any suitable source of supply, such as a funnel 24 which is here shown. The roll 14 rotates this drum so that the strips will be effectively coated and made very adhesive when the machine is in operation.

As the separators are fed between the rolls 13 and 14 the adhesive strips in parallel rows are carried around the roll 14 and simultaneously with the feeding of the separators the strips engage and are squeezed down onto the separators so as to cause the strips to adhere to the separators and to form the parallel ribs thereon. As the separators pass from between the rolls they are fastened together or connected by the long continuous strips, as shown in Fig. 1. At some point in the path of movement of the separators which may be just at the rear of the rolls or at a distance therefrom, the separators will be cut apart by severing the strips between the separators. This can be done automatically or by hand, but as at the present time I propose that the separators be cut apart by hand, I have not shown a cutter for this purpose.

In the present case the separators pass from the rolls 13 and 14 onto a receiving table 25 and thence onto a belt 26 of a conveyer, which belt engages a pair of drums 27 and 28 rotatably supported on the frame of the machine, and the former of which is connected by a belt 29 to the shaft supporting the roll 14. From the belt 26 of this conveyer the separators pass onto what may be termed a discharge board or table 30 from which they will be taken and cut apart, if not previously cut apart, and assuming that rubber separators are being ribbed, they will be placed in a vulcanizer (not shown) to vulcanize the ribs and cause them to firmly adhere to the separators.

In the event that celluloid separators are being ribbed, the strips may be applied to the belt of the upper conveyer from reels such as shown at 31 in Fig. 5 suitably supported near the end of the conveyer. Of course, in the event celluloid strips are cemented to flat celluloid separators no vulcanization is required, as the cement or adhesive agent is very volatile, and very shortly after the separators pass through the pressure applying rolls the strips will be firmly and permanently cemented to the separators, due to the rapid evaporation of the adhesive.

In applying ribs to rubber separators, instead of using rib material in the form of unvulcanized rubber strips, vulcanized strips may be employed, in which event the strips previously prepared may be fed from rolls such as shown in Fig. 5. It will be understood that if vulcanized rubber strips are employed they will be coated with a suitable rubber cement while passing around the upper roll 14, in the same manner that the unvulcanized strips are coated with gasolene. However, it is preferable in ribbing rubber separators to employ unvulcanized rubber strips as first described, as better results can be obtained than with vulcanized strips.

I am aware of the fact that numerous modifications may be made in the specific details of the machine, and I therefore do not wish to be confined to the details shown, but aim in my claims to cover all modifications which do not involve a departure from the spirit and scope of my invention.

Having thus described my invention, what I claim is:—

1. In a machine for applying ribs to storage battery separators, a pair of pressure devices between which flat storage battery separators are adapted to be moved, means for supplying rib-forming material between said pressure devices, said material being in the form of separated parallel strips, and means for applying a substance to said rib-forming material to render the same adhesive before it engages the separators.

2. In a machine for applying ribs to flat storage battery separators, a pair of applying rolls between which flat separators are adapted to be fed, one of said rolls having peripheral grooves, means for supplying rib material in the form of strips to said grooves, and means for applying a substance to said strips to make them adhesive.

3. In a machine for applying ribs to flat storage battery separators, a pair of applying rolls between which flat separators are adapted to be fed, one of said rolls having peripheral grooves, means for supplying rib material in the form of strips to said grooves, and means for applying a substance to said strips to make them adhesive, said last named means comprising a member in proximity to the surface of the grooved roll.

4. In a machine for applying ribs to storage battery separators, a pair of applying rolls between which the separators are adapted to be fed, one of said rolls having peripheral grooves, and a conveyer for conveying rib-forming material in the form of strips in parallel rows to said peripheral grooves.

5. In a machine for applying ribs to storage battery separators, a pair of applying rolls between which the separators are adapted to be fed, one of said rolls having peripheral grooves, a conveyer for conveying rib-forming material in the form of strips in parallel rows to said peripheral grooves, and means for conveying separators with the strips applied thereto away from the rolls.

In testimony whereof, I hereunto affix my signature in the presence of two witnesses.

HARRY L. BOYER.